United States Patent
Sagimori

(10) Patent No.: US 8,861,018 B2
(45) Date of Patent: Oct. 14, 2014

(54) IMAGE PROCESSING APPARATUS AND IMAGE PROCESSING METHOD FOR THINNING LINES OF COLOR CHARACTER DATA AND GENERATING COMBINED CHARACTER DATA WITH BLACK CHARACTER

(75) Inventor: Yuuki Sagimori, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/429,640

(22) Filed: Mar. 26, 2012

(65) Prior Publication Data

US 2012/0257220 A1 Oct. 11, 2012

(30) Foreign Application Priority Data

Apr. 11, 2011 (JP) ................... 2011-087350

(51) Int. Cl.
| | | |
|---|---|---|
| G06K 15/02 | (2006.01) | |
| G06K 15/00 | (2006.01) | |
| G03F 3/08 | (2006.01) | |
| H04N 1/46 | (2006.01) | |
| G03G 15/00 | (2006.01) | |
| H04N 1/58 | (2006.01) | |

(52) U.S. Cl.
CPC .... *G03G 15/5041* (2013.01); *G03G 2215/0164* (2013.01); *H04N 1/58* (2013.01)
USPC ......... 358/1.2; 358/1.11; 358/2.99; 358/3.31; 358/518; 358/528; 358/539

(58) Field of Classification Search
CPC ......... H04N 1/40; H04N 1/58; H04N 1/3935; H04N 1/4092; H04N 1/6008; H04N 1/6022; H04N 1/6072
See application file for complete search history.

(56) References Cited

U.S. PATENT DOCUMENTS

| 6,343,847 B1 * | 2/2002 | Torpey et al. ................... 347/15 |
|---|---|---|
| 6,744,921 B1 | 6/2004 | Uchida et al. |
| 7,911,645 B2 | 3/2011 | Sagimori |
| 2002/0158936 A1 * | 10/2002 | Otsuka et al. .................. 347/19 |
| 2006/0092223 A1 * | 5/2006 | Ross et al. ...................... 347/43 |
| 2008/0012894 A1 * | 1/2008 | Ono ............................... 347/21 |

(Continued)

FOREIGN PATENT DOCUMENTS

| CN | 101388948 A | 3/2009 |
|---|---|---|
| EP | 1653393 A1 | 5/2006 |

(Continued)

OTHER PUBLICATIONS

Chinese Office Action dated Apr. 2, 2014 issued in corresponding Chinese Application No. 201210105120.9 (with English translation).

*Primary Examiner* — Benny Q Tieu
*Assistant Examiner* — Haris Sabah
(74) *Attorney, Agent, or Firm* — Harness, Dickey, & Pierce, P.L.C.

(57) ABSTRACT

An image processing apparatus includes a character identifying unit configured to identify character data of black from color image data; a character data generating unit configured to add character data of a color other than black to the character data of black as additional character data to generate combined character data; and a character data correcting unit configured to perform thinning process of making a line of a character of the additional character data thinner than a line of the character data of black.

11 Claims, 6 Drawing Sheets

(56) References Cited

U.S. PATENT DOCUMENTS

| | | | |
|---|---|---|---|
| 2008/0123121 A1 | 5/2008 | Sagimori | |
| 2008/0130065 A1* | 6/2008 | Saito | 358/474 |
| 2010/0027038 A1* | 2/2010 | Miyagi | 358/1.9 |
| 2011/0128560 A1* | 6/2011 | Fujimoto et al. | 358/1.9 |

FOREIGN PATENT DOCUMENTS

| | | |
|---|---|---|
| JP | 06115171 A | 4/1994 |
| JP | 09160336 A | 6/1997 |
| JP | 2009-190347 A | 8/2009 |
| JP | 2010034747 A | 2/2010 |

* cited by examiner

FIG.3 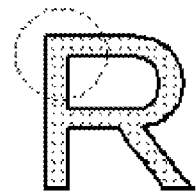 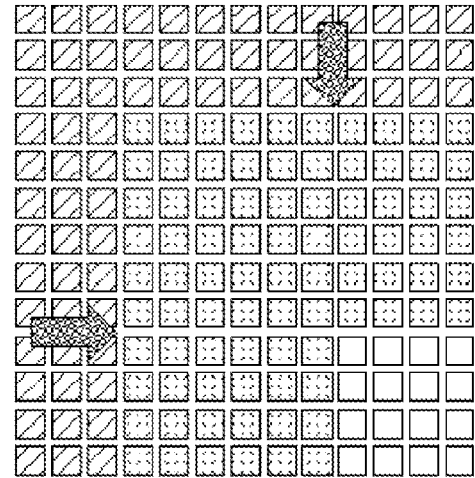
FIG.4A 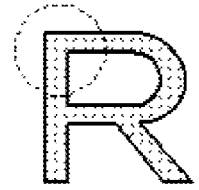 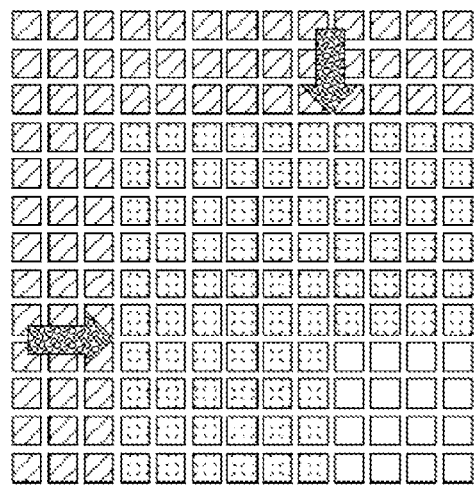
FIG.4B  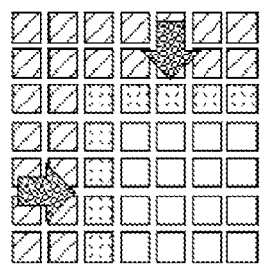

(BLACK)

(CYAN)

(BLACK)

(CYAN)

IMAGE PROCESSING APPARATUS AND IMAGE PROCESSING METHOD FOR THINNING LINES OF COLOR CHARACTER DATA AND GENERATING COMBINED CHARACTER DATA WITH BLACK CHARACTER

CROSS-REFERENCE TO RELATED APPLICATIONS

The present application claims priority to and incorporates by reference the entire contents of Japanese Patent Application No. 2011-087350 filed in Japan on Apr. 11, 2011.

BACKGROUND OF THE INVENTION

1. Field of the Invention

The present invention relates to an image processing apparatus, an image forming apparatus, an image processing method, and a computer-readable storage medium.

2. Description of the Related Art

Conventionally, among image forming apparatuses such as a printer, a copying machine, and a multifunction peripherals (MFP), for example, in an electrophotographic image forming apparatus, an image carrier such as a photosensitive element is deteriorated, resulting in image deterioration due to transfer nonuniformity on solid areas and characters in an image in some cases. In particular, in an image forming apparatus using a process cartridge in which a photosensitive element (image carrier) and a developing unit that houses toner (image forming material) are integrated with each other, if an amount of remaining toner becomes smaller and is closer to a so-called toner-near-end, transfer nonuniformity of a single color of black (K) occurs significantly. If image nonuniformity such as the transfer nonuniformity occurs, as illustrated in FIG. 10, a print density is lowered and an image, in particular, characters become pale, resulting in deterioration of image quality.

Then, conventionally, as illustrated in FIG. 11, a black solid area is formed in such a manner that four colors of cyan (C), magenta (M), yellow (Y), and K overlap. This prevents deterioration of image quality or the like due to image nonuniformity such as transfer nonuniformity from occurring.

However, in the conventional method of preventing image nonuniformity such as transfer nonuniformity by printing with four colors of CMYK, an image area, such as text and graphics, which is printed with a single color of K in a normal state, is printed with the four colors of CMYK. Therefore, a large amount of toner is consumed and color deviation occurs in printing with the colors to be used for printing, resulting in deterioration of image quality.

Japanese Patent Application Laid-open No. 2009-190347 discloses as follows. Image data is analyzed, and a character area formed by a character having a saturation of equal to or smaller than a predetermined value is extracted. Then, the character area is separated into a contour portion of the character and an internal portion of the character. Furthermore, the image data of the character contour portion and the image data of the character internal portion are converted into ink amount data for at least one type of achromatic ink and at least three types of chromatic inks. In this case, the image data of each portion is converted to the ink amount data such that the chromatic inks are used in the character internal portion more than in the character contour portion. With this method, a clear character with less blurring is formed.

However, in the conventional technique as described in Japanese Patent Application Laid-open No. 2009-190347, a character is printed not only with the color of K but also with the colors of CMYK. Therefore, there is a problem that color deviation is easy to occur among the colors of CMYK, resulting in deterioration of image quality.

Therefore, there is a need for an image processing apparatus, an image forming apparatus, an image processing method, and a computer-readable storage medium that can suppress transfer nonuniformity and color deviation so as to improve image quality while reducing the consumption of an image forming material.

SUMMARY OF THE INVENTION

It is an object of the present invention to at least partially solve the problems in the conventional technology.

According to an embodiment, there is provided an image processing apparatus that includes a character identifying unit configured to identify character data of black from color image data; a character data generating unit configured to add character data of a color other than black to the character data of black as additional character data to generate combined character data; and a character data correcting unit configured to perform thinning process of making a line of a character of the additional character data thinner than a line of the character data of black.

According to another embodiment, there is provided an image forming apparatus that includes the image processing apparatus according to the above embodiment.

According to still another embodiment, there is provided an image processing method that includes identifying character data of black from color image data; generating combined character data by adding character data of a color other than black to the character data of black as additional character data; and performing thinning process of making a line of a character of the additional character data thinner than a line of the character data of black.

According to still another embodiment, there is provided a non-transitory computer-readable storage medium with an executable program stored thereon, wherein the program instructs a computer to perform identifying character data of black from color image data; generating combined character data by adding character data of a color other than black to the character data of black as additional character data; and performing thinning process of making a line of a character of the additional character data thinner than a line of the character data of black.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a descriptive view for explaining thinning process on the basis of the number of pixels;

FIGS. 4A and 4B are descriptive views for explaining thinning process that is performed while adjusting the number of pixels to be reduced depending on a font size;

DETAILED DESCRIPTION OF THE PREFERRED EMBODIMENTS

A preferred embodiment of the invention will be described in detail with reference to accompanying drawings. It is to be noted that since the following embodiment is a preferred embodiment of the invention, various limitations that are technically preferred are made. However, a scope of the invention is not unduly limited by the following description and not all the configurations that are described in the embodiment are essential configuration requirements of the invention.

Figure 1:
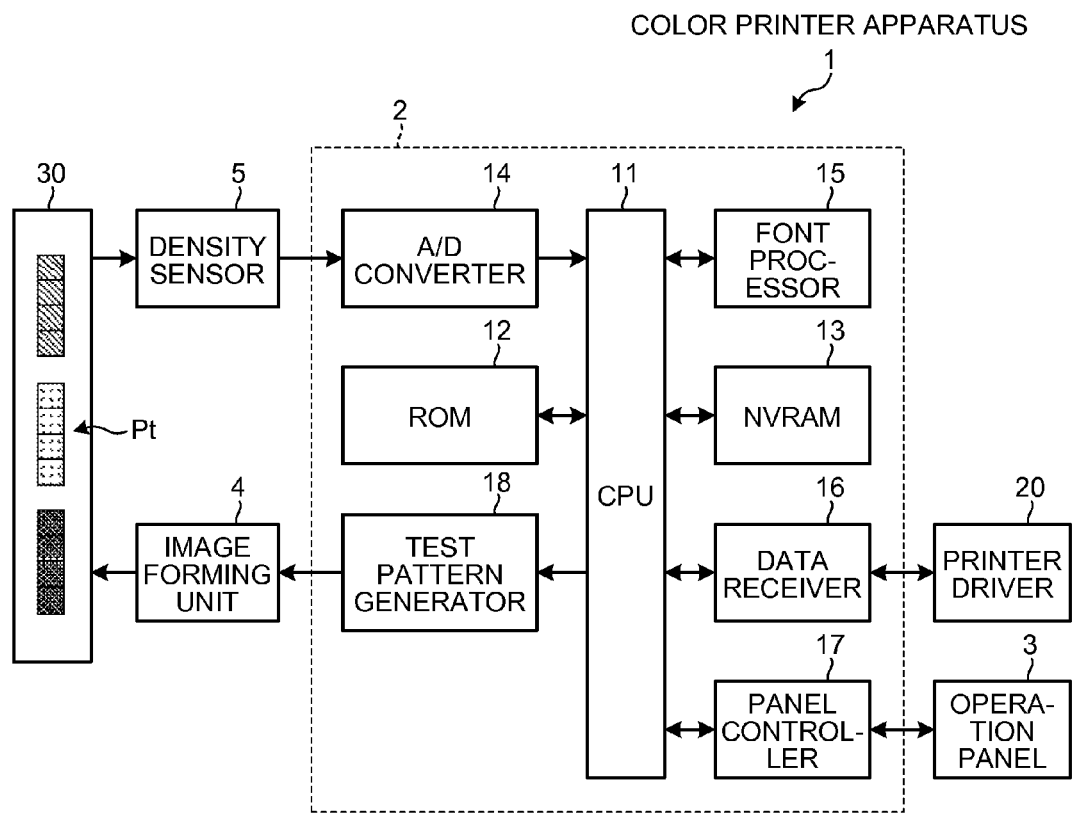
FIG. 1 is a block configuration diagram illustrating main parts of a color printer apparatus to which an embodiment of the invention is applied.

FIG. 1 to FIG. 9 are views illustrating an embodiment of an image processing apparatus, an image forming apparatus, an image processing method, an image processing program, and a storage medium according to the invention. FIG. 1 is a block configuration diagram illustrating main parts of a color printer apparatus 1 to which an embodiment of the image processing apparatus, the image forming apparatus, the image processing method, the image processing program, and the storage medium according to the invention is applied.

In FIG. 1, the color printer apparatus (image forming apparatus) 1 includes a control unit 2, an operation panel 3, an image forming unit 4, and a density sensor 5. The control unit (image processing apparatus) 2 includes a central processing unit (CPU) 11, a read only memory (ROM) 12, a non-volatile random access memory (NVRAM) 13, an A/D converter 14, a font processor 15, a data receiver 16, a panel control unit 17, and a test pattern generator 18.

In the color printer apparatus 1, a host apparatus such as a computer is connected to the data receiver 16 of the control unit 2 through a network such as local area network (LAN). The data receiver 16 receives a print job including print data (image data) of RGB (Red, Green, and Blue) or the like and print setting from a printer driver 20 mounted on the host apparatus.

The data receiver 16 transmits and receives data and commands between the host apparatus and the CPU 11. In particular, the data receiver 16 receives a print job including print data and print setting from the printer driver 20 and transmits them to the CPU 11.

The operation panel 3 includes a display unit such as a liquid crystal display (LCD). The display unit outputs to display operation keys with which settings for various operation instructions to operate at least the color printer apparatus 1 are operated and various information to be notified to a user from the image printer apparatus 1. The operation panel 3 outputs various key operation data input from the operations keys to the panel control unit 17 of the control unit 2 and outputs to display data transmitted from the panel control unit 17 on the display unit.

The panel control unit 17 transmits and receives data between the operation panel 3 and the CPU 11, outputs various key operation data from the operation panel 3 to the CPU 11, and outputs display data from the CPU 11 to the operation panel 3.

As the image forming unit (patch forming unit) 4, an electrophotographic color image forming unit is used. Although not illustrated in the drawings, the image forming unit 4 includes parts required for performing a print processing based on color draw data of CMYK or the like on paper with an electrophotographic system. For example, the image forming unit 4 includes photosensitive elements (image carriers), a charging unit, an optical writing unit, a developing unit, a transfer unit, and a cleaning unit. The photosensitive elements are arranged in parallel on a conveying path of paper (image carrier) to be conveyed from a paper feeding unit. The charging unit uniformly charges the photosensitive elements. The optical writing unit forms electrostatic latent images by emitting a laser beam modulated based on color image data transmitted from the control unit 2 onto the photosensitive elements that have been uniformly charged. The developing unit supplies toners (image forming materials) of corresponding colors to the respective photosensitive elements on which the electrostatic latent images have been formed so as to form toner images. The transfer unit transfers the toner images on the photosensitive elements onto the paper. The cleaning unit cleans remaining toner on the photosensitive elements after transferring. On the image forming unit 4, the optical writing unit is operated with the color draw data and a control signal so as to form a statistic latent image of each color on each photosensitive element for each color that is uniformly charged for each of colors (for example, each of colors of cyan (C), magenta (M), yellow (Y), and black (K)). Then, toners of the respective colors are supplied and developed onto the photosensitive elements for the corresponding colors by the developing unit so as to form toner images of the respective colors. The image forming unit 4 performs a print processing in the following manner. That is, the image forming unit 4 feeds paper between the photosensitive elements for the respective colors and the transfer unit from the paper feeding unit and sequentially transfers toner images on the photosensitive elements for the respective colors onto the paper in a superimposition manner so as to form a color toner image. Then, the image forming unit 4 conveys the paper on which the color toner image has been transferred to a fixing unit so as to fix the color toner image onto the paper by applying heat and pressure thereto by the fixing unit. It is to be noted that the paper or each photosensitive element as a target on which the image forming unit 4 forms a toner image (image of image forming material) is indicated as an image carrier 30 in FIG. 1.

Note that the image forming unit 4 is not limited to have the above configuration. For example, the image forming unit 4 may have a configuration in which toner images of respective colors formed on one photosensitive element or photosensitive elements for the respective colors are sequentially transferred onto an intermediate transfer member as an image carrier so as to form a color toner image and the color toner image on the intermediate transfer member is transferred onto paper, or the like. Furthermore, the image forming unit 4 is not limited to the electrophotographic image forming unit. For example, the image forming unit 4 may be an ink jet image forming unit. However, in the embodiment, the following description is made under an assumption that the electrophotographic image forming unit is used.

The CPU 11 controls each part of the color printer apparatus 1 based on computer programs in the ROM 12 so as to execute basic processing as the color printer apparatus 1. In addition, the CPU 11 executes rich-black process of adding another one color to a black character according to the embodiment, which will be described later, and executes an image processing method in which an additional color thinning process of thinning a line width of a character of the color to be added (additional character) is performed.

The color printer apparatus 1 is configured as an image forming apparatus on which the following image processing apparatus is mounted. The image processing apparatus executes an image processing method with a (additional color) thinning process of adding another one color to a black character and thinning a line width of a character of the color to be added, which will be described later. The image processing method is executed by reading an image processing program for executing the image processing method according to the invention and loading the image processing program in the ROM 12, the NVRAM 13, a hard disk (not illustrated), or the like. The image processing program is recorded in a computer-readable storage medium, such as a ROM, an electrically erasable and programmable read only memory (EEPROM), an EPROM, a flash memory, a flexible disk, a compact disc read only memory (CD-ROM), a compact disc rewritable (CD-RW), a digital versatile disk (DVD), a secure digital (SD) card, and a magneto-optical disc (MO). The image processing program is a program that is described with a legacy programming language such as assembler and C or an object-oriented programming language such as C++, C#, and Java (registered trademark) and can be executed by a computer. The image processing program can be stored in the above storage medium so as to be distributed.

If the CPU 11 receives print data and print setting that have been transmitted from the printer driver 20 through the data receiver 16, the CPU 11 performs an image processing required for performing a print processing specified by the print setting on the print data (image data) on the image forming unit 4, in particular, a rasterizing processing from image data of RGB to draw data such as bit map data of CMYK or the like (description is made while the draw data corresponds to CMYK image data, hereinafter). Furthermore, the CPU 11 causes the font processor 15 to execute necessity determination of rich-black process with the additional color thinning process and the additional color thinning process if necessary in the rasterizing processing.

The CPU 11 outputs the draw data of CMYK that has been image-processed and the control signal from the test pattern generator 18 to the image forming unit 4, and causes the image forming unit 4 to form a color toner image on the image carrier 30 based on the draw data.

Furthermore, the CPU 11 outputs color test pattern (patch) data stored in the NVRAM 13 or the ROM 12 to the test pattern generator 18 at a predetermined timing. Then, the test pattern generator 18 generates a test pattern Pt and outputs the test pattern Pt to the image forming unit 4. Thereafter, the image forming unit 4 is made to form the test pattern Pt on the image carrier 30.

The density sensor (density detecting unit) 5 is formed by a reflection-type optical sensor, for example. The density sensor 5 detects a density of each color of the test pattern Pt and outputs an analog density detecting signal to the A/D converter 14 of the control unit 2.

The A/D converter 14 converts the analog density detecting signal input from the density sensor 5 into a digital signal and outputs the digital signal to the CPU 11.

The CPU 11 determines whether image nonuniformity such as transfer nonuniformity occurs, in particular, transfer nonuniformity of black solid occurs based on the density detecting signal output from the A/D converter 14. Furthermore, the CPU 11 determines whether the rich-black process with the additional color thinning process using the font processor 15 is necessary in the rasterizing processing for the print data. When the rich-black process is necessary, the CPU 11 performs the rich-black process with the additional color thinning process.

It is to be noted that since a density of an image (printed image) formed by the image forming unit 4 normally changes over time, the color printer apparatus 1 has the following configuration. The color printer apparatus 1 prints the test pattern on the image forming unit 4 and detects a density of the test pattern at a predetermined timing. The predetermined timing includes a timing when the power is turned on, a timing when a specified number of sheets of paper have been printed, and a timing when requirement is made by a user. Furthermore, the color printer apparatus 1 determines whether transfer nonuniformity is present based on a detection result of the density of the test pattern and performs density correction such as γ correction. Note that the above test pattern generator 18 and the density sensor 5 can employ configurations of a test pattern generator and a density detector that the color printer apparatus 1 normally includes.

The NVRAM 13 generally stores therein an initial set value for each function and stores therein various data required for operating the control unit 2 under the control of the CPU 11.

Figure 2:
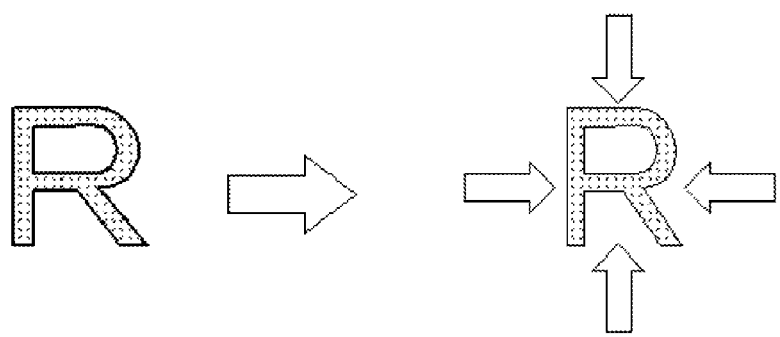
FIG. 2 is a view illustrating thinning of an additional character in a main-scanning direction and a sub-scanning direction.

The font processor (character data correcting unit) 15 performs the thinning process of thinning a line width of a character (additional character) of a color to be added to a character of black under the control of the CPU 11 when the rich black printing is performed by adding another one color to the black character. The font processor 15 performs the thinning process in only the main-scanning direction, only the sub-scanning direction, or both of the main-scanning direction and the sub-scanning direction as illustrated in FIG. 2 in the thinning process for the additional character. Furthermore, the font processor 15 performs the thinning process for the additional character when the CPU 11 performs the rasterizing processing on the image data of RGB transmitted from the host apparatus to the draw data of CMYK.

In the thinning process for the additional character, the font processor 15 basically performs the thinning process by previously setting the number of pixels for thinning (hereinafter, referred to as set thinning pixel number) while a unit for thinning is set to a pixel of data that is output from the image forming unit 4, and reducing pixels of the set thinning pixel number from pixels of the output image data. However, the number of pixels of the data output from the image forming unit 4 changes depending on an output resolution. Therefore, the number of pixels that is to be actually thinned (hereinafter, referred to as actual thinning pixel number) is corrected with the output resolution. For example, as illustrated in FIG. 3, when a line of a character is set to be thinned by 3 pixels as the set thinning pixel number with a resolution of 600 dpi, the font processor 15 executes the thinning process while 6 pixels are set as the actual thinning pixel number when the image data is output with a resolution of 1200 dpi. It is to be noted that FIG. 3 illustrates a case where thinning process of compressing light hatching portions on an additional character of 9 pixels in which deep hatching and light hatching are combined so as to form an additional character with only deep hatching portions is performed. In other words, the font processor 15 changes the actual thinning pixel number in accordance with an output resolution.

Furthermore, the font processor 15 may determine the actual thinning pixel number by correcting the set thinning pixel number depending on a font size in the thinning process. When the set thinning pixel number is set to perform the thinning, if the thinning process is performed by thinning a line of a character by the set thinning pixel number, a character disappears depending on a font size in some cases. For example, as illustrated in FIGS. 4A and 4B, it is assumed that the set thinning pixel number is "3 pixels". In this case, when the font size is large as illustrated in FIG. 4A, a character does not disappear even when the thinning process of thinning a line of a character by "3 pixels" as the set thinning pixel number is performed. However, as illustrated in FIG. 4B, as for a character font having a font size formed by 3 pixels, if a line of a character is thinned by "3 pixels" as the set thinning pixel number, the character disappears. In such a case, the font processor 15 performs the thinning process such that at least one pixel is left, for example.

Figure 5:
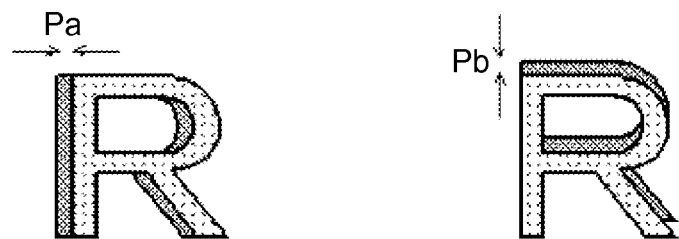
FIG. 5 is a view illustrating setting of a set thinning pixel number in a range of color deviation based on a standard of an image forming unit.

A case where the thinning process of thinning a line of a character by the same number of pixels in both of the main-scanning direction and the sub-scanning direction is performed has been described above. However, the thinning process is not limited to the thinning process of thinning a line of a character by the same number of pixels in both of the main-scanning direction and the sub-scanning direction. For example, thinning process of thinning a line of a character only in the main-scanning direction or the sub-scanning direction may be performed. Alternatively, thinning process of thinning a line of a character by different numbers of pixels in the main-scanning direction and the sub-scanning direction may be performed. Furthermore, the number of pixels in the main-scanning direction and the sub-scanning direction in the thinning process may be set in a range of color deviation based on a standard of the image forming unit 4. For example, the number of pixels may be set such that Pa pixel is set to be thinned in the main-scanning direction and Pb pixel is set to be thinned in the sub-scanning direction, as illustrated in FIG. 5.

Next, actions of the embodiment are described. The color printer apparatus 1 according to the embodiment generates character data of a character of print data by adding one color of three colors of CMY to a color of K. In addition, the color printer apparatus 1 thins and adds the additional character.

In the color printer apparatus 1, if transfer nonuniformity occurs due to deterioration of the photosensitive elements or the like, a print density is lowered, and an image, in particular, a character becomes pale, resulting in deterioration of image quality, as described above. Then, if printing is performed by combining four colors of CMYK as in the conventional technique, a large amount of an image forming material such as toner is consumed and color deviation occurs in printing with the colors to be used for printing, resulting in deterioration of image quality.

Figure 6:
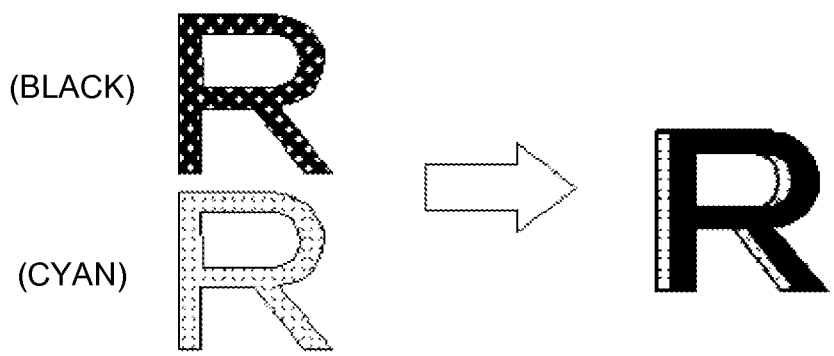
FIG. 6 is a descriptive view for explaining rich-black process of adding a character of cyan to a character of black.
Figure 7:
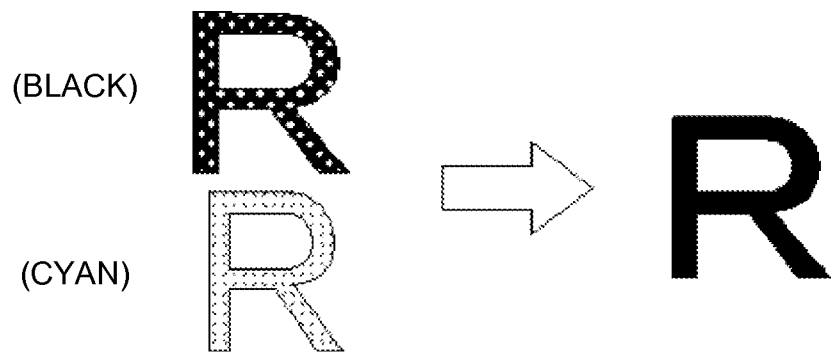
FIG. 7 is a descriptive view for explaining rich-black process with thinning of an additional character.

In order to solve the problem, in the color printer apparatus 1 according to the embodiment, if there is a risk that transfer nonuniformity occurs, when a character of K is printed, a combined character image is generated by adding one certain color of CMY, for example, a character of C having the same font size as an additional character to the character of K as illustrated in FIG. 6. In addition, the thinning process of thinning the additional character is performed, and then, the additional character is added, as illustrated in FIG. 7. It is to be noted that the color of the character to be added to K is not limited to C and may be M or Y.

Even when the additional character is set to be one color, if color deviation between the character of K and the character of the additional one color occurs, image quality is deteriorated as illustrated in FIG. 6.

In order to solve the problem, in the color printer apparatus 1 according to the embodiment, as illustrated in FIG. 7, the thinning process of thinning a line of the additional character is performed by the font processor 15, and then, the rich-black process with the thinning in which the additional character is added to the character of K is performed.

Figure 8:
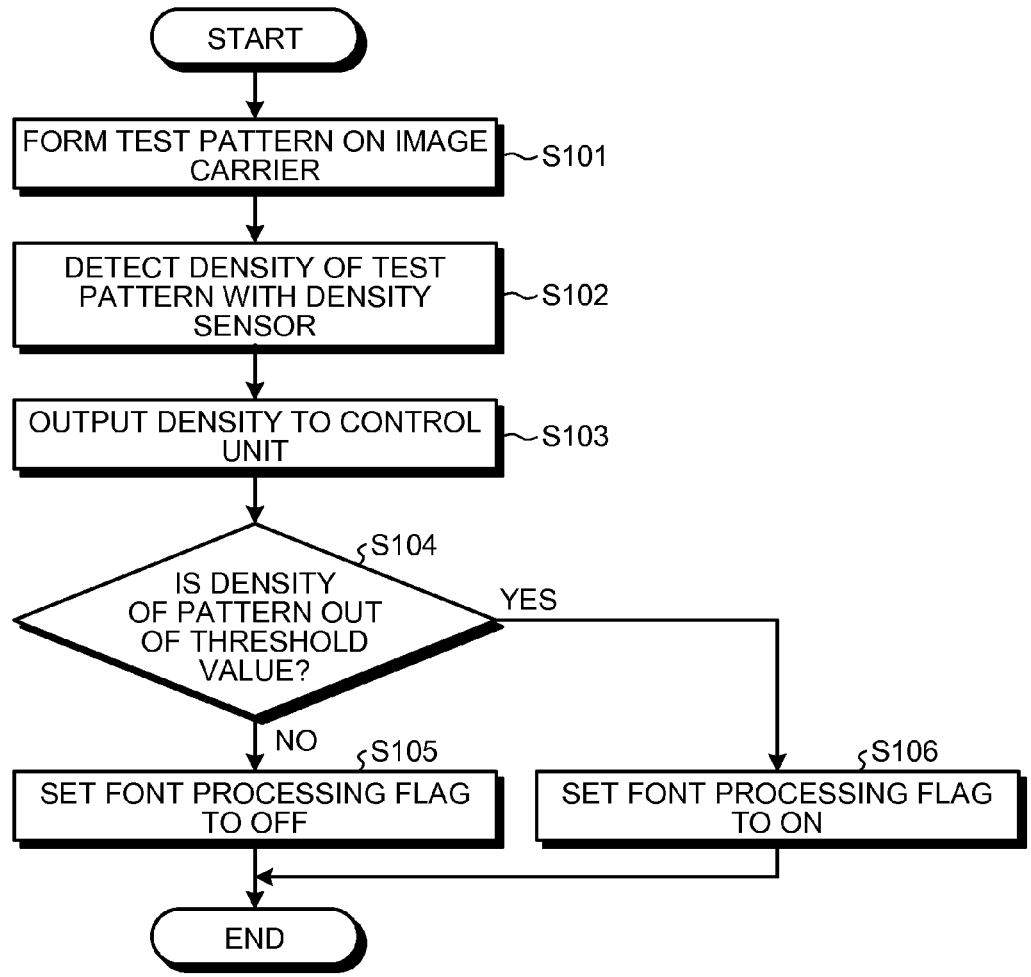
FIG. 8 is a flowchart illustrating a necessity determination process of the rich-black process with the thinning.

Furthermore, the color printer apparatus 1 determines whether the rich-black process with the thinning process is performed based on a set result of an operation with keys on the operation panel 3 by a user or a set result by the printer driver 20 of the host apparatus. In addition, the color printer apparatus 1 automatically determines whether the rich-black process with the thinning process is performed based on the density of the test pattern Pt as illustrated in FIG. 8. Whether the automatic determination of the execution necessity for the rich-black process is performed can be set by operating the keys on the operation panel 3. It is to be noted that when a user determines whether the rich-black process is performed with a manual operation, for example, the user determines by observing an actual printed material and sets whether the rich-black process is performed on set items for the printer driver 20 of the host apparatus or the operation panel 3 of the color printer apparatus 1.

First, the automatic determination of the execution necessity for the rich-black process is described with reference to FIG. 8. The color printer apparatus 1 forms a color test pattern Pt on the image carrier 30 at a predetermined timing. Then, the color printer apparatus 1 determines whether the rich-black process with the thinning process is executed based on a result of detection of a density of the test pattern Pt, as illustrated in FIG. 8.

In the color printer apparatus 1, the CPU 11 transmits test pattern data stored in the ROM 12 or the NVRAM 13 to the test pattern generator 18 at a predetermined timing and the test pattern generator 18 causes the image forming unit 4 to form the test pattern Pt on the image carrier 30 (step S101).

The color printer apparatus 1 detects a density of the test pattern Pt formed on the image carrier 30 with the density sensor 5 (step S102). Then, the color printer apparatus 1 outputs an analog density detecting signal to the A/D converter 14 of the control unit 2 and the A/D converter 14 converts the analog density detecting signal into the digital signal and outputs the converted digital signal to the CPU 11 (step S103).

The CPU 11 compares a previously set threshold density serving as a reference for determining whether the rich-black process with the thinning process is necessary with the density detecting signal to determine whether the density of the test pattern Pt is equal to or larger than the threshold value (step S104). If the density of the test pattern Pt is equal to or larger than the range of the threshold value, the CPU 11 sets a flag (font processing flag) indicating necessity of the rich-black process with the thinning process to be OFF so as to end the rich-black process necessity determination process (step S105).

If the density of the test pattern Pt is smaller than the threshold value at step S104, the CPU 11 sets the font processing flag to be ON so as to end the rich-black process necessity determination process (step S106).

Figure 9:
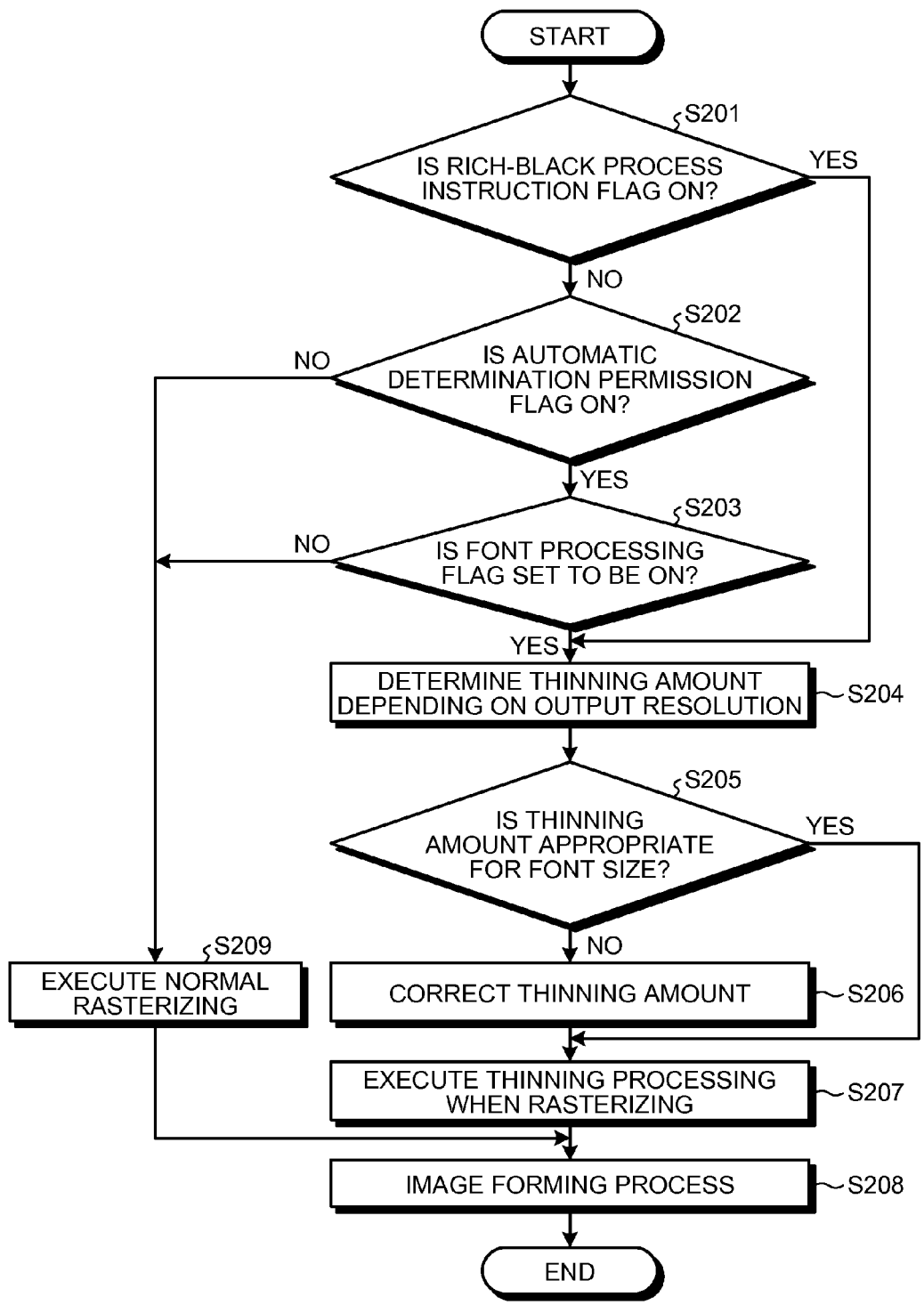
FIG. 9 is a flowchart illustrating an image forming process with rich-black process control.
Figure 10:
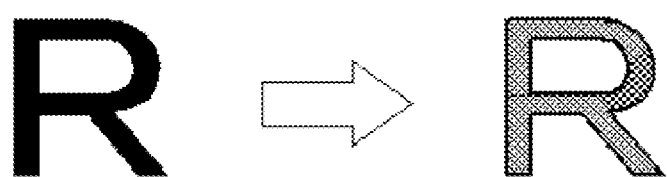
FIG. 10 is a view illustrating an occurrence state of transfer nonuniformity in a conventional technology.
Figure 11:
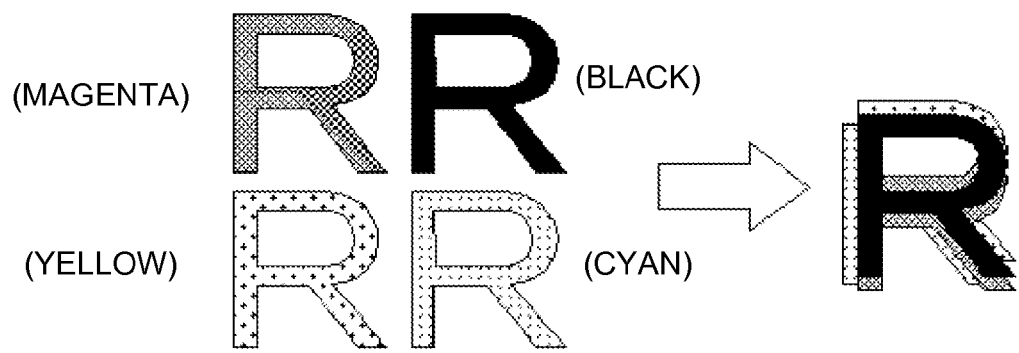
FIG. 11 is a descriptive view for explaining a case where transfer nonuniformity is prevented from occurring by combining colors of CMYK in a conventional technology.

Then, the color printer apparatus 1 performs the rich-black process as illustrated in FIG. 9. If the color printer apparatus 1 receives a print job including print data and print setting from the host apparatus, the CPU 11 checks whether a rich-black process instruction flag is set to be ON through manual setting on the operation panel 3 first when the print data of the print job is to be printed (step S201). The rich-black process instruction flag indicates whether the user instructs to execute the font processing (hereinafter, appropriately referred to as rich-black process simply) as the rich-black process with the thinning process. If the rich-black instruction flag is not set to be ON, the CPU 11 checks whether an automatic determination permission flag is set to be ON (step S202). The automatic determination permission flag indicates whether to follow the result of the rich-black process necessity determination process.

If the automatic determination permission flag is set to be ON at step S202, the CPU 11 checks whether the font processing flag is set to be ON in the rich-black process necessity determination process as described with reference to FIG. 8 (step S203). If the font processing flag is set to be ON, the CPU 11 acquires an output resolution when the print data is output for printing on the image forming unit 4 from the print setting so as to determine an amount by which an additional character is thinned by the font processor 15 based on the output resolution (hereinafter, referred to as "a thinning amount") (step S204).

Next, the CPU 11 determines whether the determined thinning amount is appropriate for a font size of the additional character, that is, whether the additional character does not disappear (step S205). If the thinning amount is not appropriate, the CPU 11 corrects the thinning amount based on the font size illustrated in FIGS. 4A and 4B and transmits the corrected amount to the font processor 15 (step S206).

When the CPU 11 performs the rasterizing processing on the print data to draw data that can be printed on the image forming unit 4, the CPU 11 causes the font processor 15 to perform the thinning process on the additional character based on the corrected thinning amount and performs the rich-black process of adding the additional character on which the thinning process has been performed by the font processor 15 to corresponding character data of the draw data (step S207). Then, the CPU 11 transmits the draw data on which the rich-black process has been performed to the image forming unit 4 so as to perform an image forming process of printing in the image forming unit (step S208).

If the determined thinning amount is appropriate for the font size at step S205, the process proceeds to S207 and the CPU 11 causes the font processor 15 to perform the thinning process for the additional character based on the thinning amount that has been determined at step S204 when the rasterizing processing is performed on the print data to draw data that can be printed on the image forming unit 4, and performs the rich-black process of adding the additional character on which the thinning process has been performed to the corresponding character data of the draw data (step S207). Then, the CPU 11 transmits the draw data on which the rich-black process has been performed to the image forming unit 4 so as to perform the image forming process of printing on the image forming unit 4 (step S208).

Furthermore, if the font processing flag is set to be OFF at step S203, the CPU 11 performs the normal rasterizing processing without the rich-black process (font processing) on the print data (step S209). Then, the CPU 11 transmits the draw data on which the rasterizing processing has been performed to the image forming unit 4 so as to perform the image forming process of printing on the image forming unit 4 (step S208).

Moreover, if the automatic determination permission flag is not set to be ON at step S202, the CPU 11 performs the normal rasterizing processing without the rich-black process (font processing) on the print data (step S209). Then, the CPU 11 transmits the draw data on which the rasterizing processing has been performed to the image forming unit 4 so as to perform the image forming process of printing on the image forming unit 4 (step S208).

Furthermore, if the rich-black process instruction flag is set to be ON at step S201, the process proceeds to step S204 and the CPU 11 performs the same processing as those described above from the processing of acquiring an output resolution when the print data is output for printing on the image forming unit 4 from the print setting so as to determine an amount by which the additional character is thinned by the font processor 15 based on the output resolution. The CPU 11 performs the rich-black process of adding the additional character on which the thinning process has been performed to the corresponding character data of the draw data, and then, transmits the processed draw data to the image forming unit 4 so as to perform the image forming process of printing on the image forming unit 4 (steps S204 to S208).

In this manner, in the color printer apparatus 1 according to the embodiment, the CPU 11, which functions as a character determining unit, identifies character data of black from color image data. The CPU 11, which functions as a character generating unit, adds character data of a color other than black to the character data of black as additional character data to generate combined character data. In addition, the CPU 11, which functions as a character data correcting unit, performs the thinning process of making a line of a character of the additional character data thinner than a line of the character data of black.

Accordingly, in the rich-black process of making black rich by adding a character of another color to character data of black in image data to be processed, one color other than black can be added to a character of black and the additional character can be made thinner and added. Therefore, the consumption of an image forming material such as toner can be reduced. In addition, a problem that the additional character runs off the black character and color deviation occurs, resulting in deterioration of image quality can be prevented from occurring.

Furthermore, in the color printer apparatus 1 according to the embodiment, the font processing unit 5, which functions as the character data correcting unit, performs thinning process of thinning a line of a character of additional character data to be added to character data of black in at least one of the main-scanning direction and the sub-scanning direction.

Accordingly, in the rich-black process, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring appropriately and easily.

Furthermore, in the color printer apparatus 1 according to the embodiment, the font processing unit 5, which functions as the character data correcting unit, performs thinning process of thinning a line of a character of additional character data based on pixels of the character data of black.

Accordingly, in the rich-black process, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring appropriately and easily.

Furthermore, in the color printer apparatus 1 according to the embodiment, the font processing unit 5, which functions as the character data correcting unit, performs thinning process of thinning a line of a character of additional character data in accordance with a specified output resolution that is specified as a resolution with which image data is output.

Accordingly, in the rich-black process, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring appropriately and easily.

Furthermore, in the color printer apparatus 1 according to the embodiment, the font processing unit 5, which functions as the character data correcting unit, performs thinning process of thinning a line of a character of additional character data based on a font size of character data of black.

Accordingly, in the rich-black process, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring appropriately and easily.

Furthermore, in the color printer apparatus 1 according to the embodiment, the font processing unit 5, which functions as the character data correcting unit, performs thinning process of thinning a line of a character of additional character data within a range of a maximum color deviation amount for an output resolution of image data.

Accordingly, in the rich-black process, a character of one color other than black can be added to a character of black and the additional character can be made thinner and added further appropriately. Therefore, the consumption of an image forming material such as toner can be reduced. In addition, a problem that the additional character runs off the black character, resulting in deterioration of image quality can be prevented from occurring further appropriately.

Furthermore, the color printer apparatus 1 according to the embodiment forms a test pattern Pt as a solid patch of at least a single color of black on the image carrier 30 by the image forming unit (patch forming unit) 4, detects a density of the test pattern Pt by the density sensor (density detecting unit) 5. Then, the CPU 11 controls the generation of combined character data and the thinning process by the font processor (character data correcting unit) 15 based on the detected density of the test pattern Pt.

Accordingly, a risk that image nonuniformity occurs is appropriately judged and if there is the risk that image nonuniformity occurs, the rich-black process with the thinning process is performed. With this, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring further appropriately.

Furthermore, in the color printer apparatus 1 according to the embodiment, the CPU 11 generates combined character data and performs the thinning process by the font processor 15 if the density of the test pattern Pt that has been detected by the density sensor 5 is smaller than a predetermined threshold density.

Accordingly, a risk that image nonuniformity occurs is appropriately judged and if there is the risk that image nonuniformity occurs, the rich-black process is performed. With this, a character of one color other than black can be added to a character of black and the additional character can be made thinner and added appropriately and easily. Therefore, the consumption of an image forming material such as toner can be reduced. In addition, a problem that the additional character runs off the black character, resulting in deterioration of image quality can be prevented from occurring further appropriately.

According to the embodiment, transfer nonuniformity and color deviation can be suppressed so as to improve image quality while reducing the consumption of an image forming material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a character identifying unit configured to identify character data of black from color image data;
   a character data generating unit configured to add character data of only one color other than black, to the character data of black as an additional character data to generate combined character data; and
   a character data correcting unit configured to perform thinning process of making a line of a character of the additional character data thinner than a line of the character data of black,
   wherein the character data correcting unit is further configured to perform the thinning process without changing the line of the black character data.

2. The image processing apparatus according to claim 1, wherein the character data correcting unit performs the thinning process of thinning the line of the character of the additional character data in at least one of a main-scanning direction and a sub-scanning direction.

3. The image processing apparatus according to claim 1, wherein the character data correcting unit performs the thinning process of thinning the line of the character of the additional character data based on pixels of the character data of black.

4. The image processing apparatus according to claim 1, wherein the character data correcting unit performs the thinning process of thinning the line of the character of the additional character data in accordance with a specified output resolution that is specified as a resolution with which the image data is output.

5. The image processing apparatus according to claim 1, wherein the character data correcting unit performs the thinning process of thinning the line of the character of the additional character data based on a font size of the character data of black.

6. The image processing apparatus according to claim 1, wherein the character data correcting unit performs the thinning process of thinning the line of the character of the additional character data within a range of a maximum color deviation amount for an output resolution of the image data.

7. The image processing apparatus according to claim 1, further comprising:
   a patch forming unit configured to form a solid patch of at least a single color of black on an image carrier; and a density detecting unit configured to detect a density of the solid patch, wherein the character data generating unit and the character data correcting unit perform generation of the generation of the combined character data and the thinning process, respectively, based on the density of the solid patch.

8. The image processing apparatus according to claim 7, wherein if the density of the solid patch is smaller than a predetermined threshold density, the character data generating unit and the character data correcting unit perform generation of the generation of the combined character data and the thinning process, respectively.

9. An image forming apparatus comprising the image processing apparatus according to claim 1.

10. An image processing method comprising:
   identifying character data of black from color image data;
   generating combined character data by adding character data of only one color other than black to the character data of black as an additional character data; and
   performing a thinning process of making a line of a character of the additional character data thinner than a line of the character data of black,
   wherein the thinning process is performed without changing the line of the black character data.

11. A non-transitory computer-readable storage medium with an executable program stored thereon, wherein the program instructs a computer to perform:
   identifying character data of black from color image data;
   generating combined character data by adding character data of only one color other than black to the character data of black as an additional character data; and
   performing thinning process of making a line of a character of the additional character data thinner than a line of the character data of black,
   wherein the thinning process is performed without changing the line of the black character data.

* * * * *